United States Patent [19]
Gans

[11] 3,735,282
[45] May 22, 1973

[54] LIQUID-COOLED, SEGMENTED GLASS LASER

[76] Inventor: Francois F. Gans, 38 rue Gustav Vatonne, Gif-sur-Yvette, France

[22] Filed: June 14, 1972

[21] Appl. No.: 262,600

[52] U.S. Cl. ................................331/94.5, 330/4.3
[51] Int. Cl. ..............................................H01s 3/04
[58] Field of Search .....................331/94.5; 330/4.3

[56] References Cited
UNITED STATES PATENTS

| | | | |
|---|---|---|---|
| 3,487,330 | 12/1969 | Gudmundsen | 331/94.5 |
| 3,675,152 | 7/1972 | Young | 331/94.5 |

*Primary Examiner*—William L. Sikes
*Attorney*—Abraham A. Saffitz

[57] ABSTRACT

Laser device of the neodymium doped glass disc array type. The discs are spaced apart from one another and are immersed in a liquid whose refractive index is equal, for the emission wavelength of the laser, to the refractive index of the glass forming the discs. The disc inclination angle with respect to the disc alignment direction can take any desired value. To pump the discs in the whole volume thereof, the spacing is given a value higher than a predetermined minimal value and an inclination angle of 45° is selected. The immersion liquid is a mixture of a brominated saturated acyclic hydrocarbon and a saturated acyclic alcohol.

3 Claims, 5 Drawing Figures

Patented May 22, 1973 3,735,282

LIQUID-COOLED, SEGMENTED GLASS LASER

This invention relates to segmented solid state lasers and more particularly to high energy segmented neodymium glass lasers using an array of discs.

Laser device using disc-shaped bodies of laser material which are positioned at the Brewster angle have been recently developed. They have with respect to conventional lasers using long laser material rods significant advantages. It is known that high outputs of laser energy are obtained by increasing the pumping energy and the length and diameter of the laser rod. A diameter limit and a length limit are reached beyond which an increase in the diameter and length of the rod does not produce a proportional increase in the laser output energy. As the depth to which the pumping energy can penetrate is limited, beyond a particular diameter size the laser energy increases proportionally to the diameter of the rod and not to the volume thereof and beyond a higher diameter size the beam takes a somewhat hollow configuration due to the reduced excitation or the absence of excitation at the center of the rod. Increasing the length of the laser rod presents (*i*) the practical problems of producing long pieces of optically perfect laser material, (*ii*) mechanical and thermal problems, (*iii*) risks of destruction of the laser material at high levels of laser energy density and (*iv*) a spontaneous avalanche condition due to high gain-length factor of the laser rod.

A thin laser disc having large end surface areas and inclined with respect to the laser axis at the Brewster angle (the Brewster angle is in the range of approximately 57° to 60° for conventional solid laser materials) can be optically pumped in its total volume since the pumping energy can penetrate at the same time the plane faces and the cylindrical face of the disc (pumping energy can penetrate in the portion of the plane faces of each disc not masked by the adjacent disc with respect to the flash lamp). Thus the laser beam generated by the laser disc does not have the undesired hollow configuration which the rod-type laser may have due to unexcited central portions. Further, the disc having a larger diameter than the rod, high energy operation can take place at much lower energy density, thereby avoiding the danger of destruction of the laser material. Finally, the gain-length factor of the laser disc being small prevents the spontaneous avalanche condition.

It has also been proposed to cool a segmented laser structure by a coolant fluid and at the same time to avoid any losses at the interface between the coolant and the laser material by matching their refractive indices at the laser wavelength and to select as coolant fluid a coolant transparent at both the laser and pumping wavelength and stable under the pumping illumination. In function of the laser material, the coolant can be selected from the group consisting of water, heavy water, methyl alcohol, benzine and freon, a solution of $CaCl^2$ in heavy water and a solution of baryum iodomercurate in heavy water.

Neodymium-doped crown glass has a refractive index of about 1.512 to 1.520 at 20°C for the wavelength 1.058 $\mu$m. The coolant fluid must have such a high refractive index and additionally must be transparent at the emission wavelength of 1.058 $\mu$m and at the pumping wavelength and must not be submitted to photolyse, i.e. to decomposition, by photonic illumination in the spectral region of the pumping lamp radiation. The pumping lamps are generally either high pressure mercury arc light lamps or xenon or krypton flash lamps all having significant radiations in the ultra-violet spectral region.

Attempts to find liquids or passive liquid mixtures meeting the above-mentioned conditions have been unsuccessful. The refractive index of water (1.324) at the laser wavelength and heavy water (1.323) are definitely too small and these material absorb the light at 1.06 $\mu$m, the second with a degree 10 times lower than the first. Saturated alcohols used alone have refractive indices by far smaller than that of neodymium doped glass for instance, 1.31 for methanol and 1.38 for ethanol instead of 1.52 for neodynium doped glass. Barium iodomercurate and barium bromomercurate, respectively $Ba[HgI_4]$ and $Ba[HgBr_4]$ are decomposed after a time by ultra-violet radiations with production of free mercury and their refractive index, if it can match that of neodymium-doped calcium fluoride (1.428 at 1.06 $\mu$m) is by far smaller to the desired index of 1.52. Benzene (refractive index 1.47) and more generally liquid unsaturated organic substances are photolyzed by ultra-violet radiations.

I have found that bromo-substituted saturated acyclic hydrocarbons react with saturated acyclic alcohols when illuminated by ultra-violet radiation and that the reaction is reversed during the intervals between illumination pulses. Although the actual mechanism of the reaction is not certain and I do not wish to be restricted to the explanation thereof, I believe that the following reactions take place, taking as example of bromo-substituted saturated hydrocarbon, bromoform $CHBr_3$ and as saturated acyclic alcohol, anhydrous ethanol $C_2H_5OH$. Ultra-violet photons dissociate $CHBr_3$ into (*i*) $CHBr_2$ and Br (atomic) and (*ii*) $CBr_2$ and HBr:

$$CHBr_3 + h\nu(U.V.) \rightleftarrows CHBr_2 + Br \quad (1)$$

$$CHBr_3 + h\nu(U.V.) \rightarrow CBr_2 + HBr \quad (2)$$

Atomic bromine Br converts into molar bromine $Br_2$:

$$Br + Br \rightarrow Br_2 \quad (3)$$

in acid medium due to HBr, $Br_2$ reacts with $C_2H_5OH$:

$$Br_2 + C_2H_5OH \rightarrow C_2H_5Br + BrOH \quad (4)$$

$$HBr + C_2H_5OH \rightleftarrows C_2H_5Br + H_2O \quad (5)$$

Reactions (1) and (2) are reversed in the absence of ultraviolet radiation and reaction (5) is reversed when the temperature falls under about 80°C. Accordingly, bromoform and ethanol which react on each other during illumination, reform during the pulse intervals, except for a small quantity of hypobromous acid which forms quite slowly and progressively decreases the transparency of the index matching liquid to the pumping radiation between 5000 and 8800 A.

The bromo-compounds must have at least three bromine atoms per molecule in order for the refractive index to exceed the predetermined value of 1.52. The amount of alcohol is such that the mixture has a refractive index of 1.52. In the case of bromoform and ethanol, the weight composition of the liquid mixture is 60 percent bromoform, 40 percent ethanol. Further the alcohol must have at least two radicals (OH) for 10 atoms of bromine in order to give to the mixture a life expectancy of 100 hours.

It is therefore the object of the present invention to provide a laser structure utilizing segmented neodymium-doped glass and cooled by a liquid having a refractive index identical to that of said glass, said liquid remaining transparent to the pumping illumination despite the U.V. radiation comprised therein.

The invention will now be described in detail with reference to the accompanying drawings in which.

Figure 1:
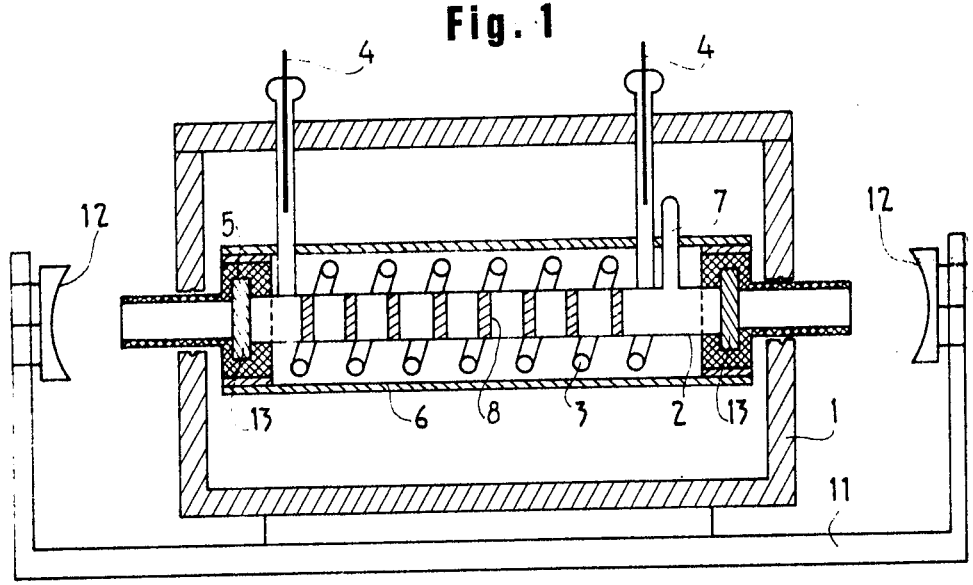
FIG. 1 is a partial, sectional elevation of a laser structure having a segmented laser rod immersed in a coolant and index matching liquid.
Figure 2:
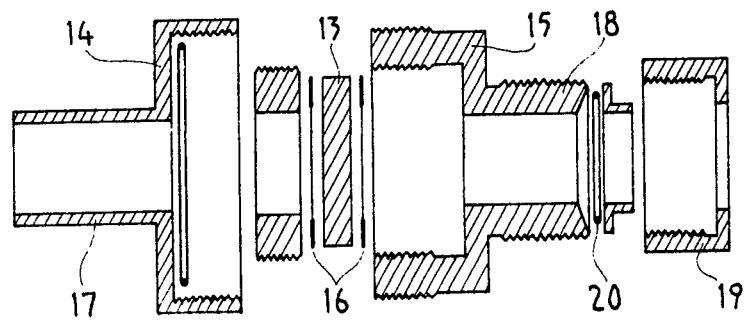
FIGS. 2, 3a and 3b illustrate details of the apparatus of FIG. 1.

Referring to FIG. 1, the laser proper is placed inside a thermostatically controlled housing 1 and includes a tube or tank 2 containing the active segmented laser medium, a helical optical pumping arc lamp 3 ending with electrodes 4 and containing krypton or xenon or a melange thereof, and caps 5 to close the tube 2. The tube 2 and the helical arc lamp 3 are mounted coaxially. A hollow member 6 surrounds the arc lamp 3 and the tank 2; it may be mirrored on its surface to aid reflection of light from the arc lamp into the lasering material in the tank.

The tube 2 is a "Pyrex" glass tube of 3 cm. internal diameter and 1.5 mm. thickness. It may be coated externally with an ultraviolet-absorbing layer and is equipped with a side-arm 7 to eliminate gas bubbles from the liquid it contains.

The tube 2 is filled with a number of neodymium-doped crown glass discs 8, 3 cm. in diameter and 2 mm. thick. The refractive index of this glass for the wavelength 1.058 $\mu$m is 1.512 at 20°C. The discs are placed in a liquid mixture 9 of 60 percent bromoform and 40 percent ethanol. The wall of the tube 2 containing the discs 8 and the liquid 9 is coated with an ultra-violet-absorbent layer, but this coating is not necessary.

Figure 3A:
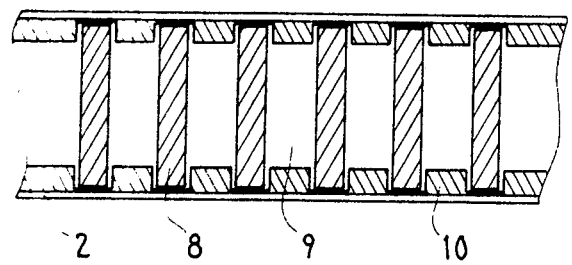
Figure 3B:
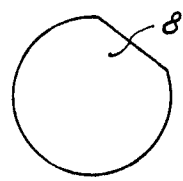

The spacing between the discs if not critical. They may be set in a comb 10 as shown in FIG. 3a. They are apertured at their periphery to allow the cooling fluid to circulate (see FIG. 3b).

The laser device is placed on an optical bench 11 between two mirrors 12. Each end of the tube 2 is closed by a neodymium-doped crown glass window 13. This window is clamped between two threaded joints 14 and 15 with interposition of flat joints 16 in polytetrafluorethylene, the threaded joints ending in tubular sections 17 and 18. Onto the tubular section 18 can be screwed a threaded ring 19 in which the tube passes and which serves to grip an O-ring seal 20.

An ultra-violet-absorbing substance is mixed with the liquid in the thermostat 1 to enhance the effect of the layer covering the tube 2 and prevent photolysis of the liquid it contains. This absorbant can be a mixture of cerium and ammonium nitrate dissolved in water in the ratio 1/100 by weight, which eliminates radiations of wavelength below 0.46 $\mu$m.

Figure 4:
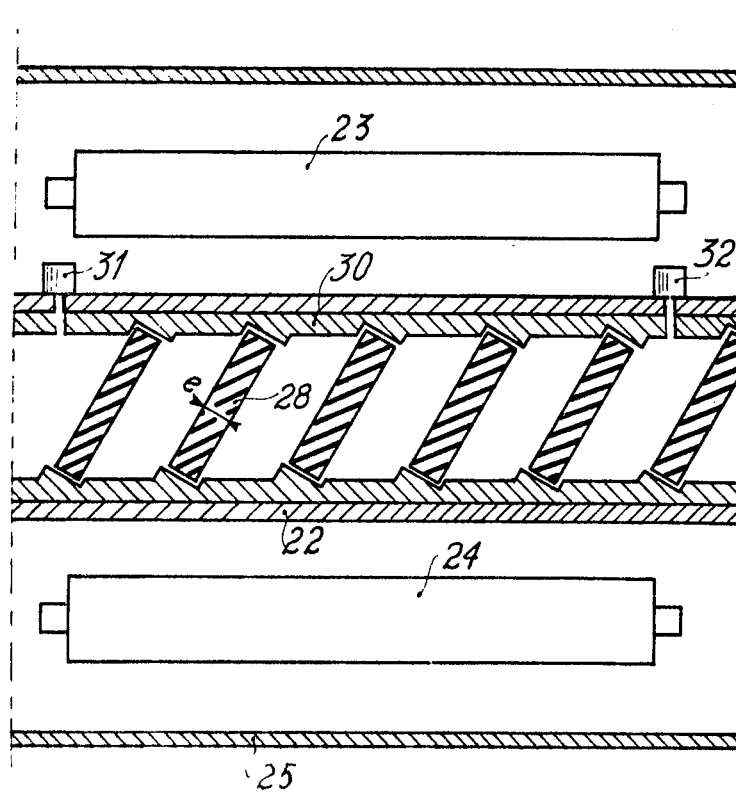
FIG. 4 represents a laser of the invention which parallel discs at 45° with respect to the laser axis.

Referring now to FIG. 4 the tube 22 contains neodymium glass elliptical discs 28 which are oriented at 45° with respect to the axis of the tube. The discs 28 are held in position by a comb 30 having inclined gooves and which can be separated into two halves for mounting purposes. The tube 22 is provided with an inlet 31 and an outlet 32 for allowing an appropriate refractive index liquid to circulate by means of a pump not shown and simultaneously cool the emissive discs.

The active tube is illuminated by two flashlamps 23 and 24 parallel to the axis of tube 22 and located in the plane passing through the projection of the tube axis onto the planes of the discs. The flashlamps and the tube containing the segmented neodymium glass are surrounded by a mirror 25. If $d$ and $e$ respectively designate the diameter and thickness of the discs, the spacing therebetween is taken at least equal to ($d\ \sqrt{2}/4\ +\ e\ \sqrt{2}$). It results that each disc is thus pumped by the lamps up to its center, the first flashlamp pumping a half volume of the disc and the other flashlamp the other half volume. Under these conditions, the weight percent doping in $Nd_2O_3$ can be increased with respect to the prior art, say from 3 to 5 percent.

Bromoform has a refractive index of 1.598 at 1.06 $\mu$m and ethanol an index of 1.38.

A second example of coolant and refractive index matching liquid is given hereinafter. It comprises 64 percent 1,2-tribromoethane

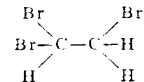

which has a refractive index of 1.588 and 36 percent of propanol

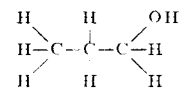

having a refractive index of 1.39.

The laser of the invention has been tested as regards its expected lifetime. The coolant fluid continuously irradiated by a 250 watt high pressure xenon arc lamp has experienced a decrease of transparency of 5 percent in the 5000–8800 A range of pumping illumination after a test of 100 hours.

Since the bromined compounds on the one hand and the alcohols on the other hand have very close refractive index, the mixture generally comprises from 55 to 65 percent of the first compound and from 45 to 35 percent of the second component.

I claim:

1. In a laser structure comprising an elongated tube, neodymium doped glass discs inserted in said tube and spaced apart therebetween, means for holding said discs parallel to one another, a coolant liquid substance filling in said tube and in which the discs are immersed, said liquid substance having a refractive index matching that of the glass forming the discs for the wavelength radiated by the laser device and means for optically pumping said discs, the improvement in which the coolant and refractive index matching liquid is a mixture of a refractive index-increasing, bromine substituted acyclic hydrocarbon having at least three bromine atoms per molecule and a saturated acyclic alcohol having at least one hydroxyl radical (OH) for five bromine atoms in the hydrocarbon molecule.

2. In the laser structure of claim 1, the bromine substituted acyclic hydrocarbon is bromoform $CHBr_3$ in the percentage of about 55 to 65 percent and the saturated acyclic alcohol is ethanol in the percentage of about 45 to 35 percent.

3. In the laser structure of claim 1, the bromine substituted acyclic hydrocarbon is 1,2 - tribromoethane in the percentage of about 55 to 65 percent and the saturated acyclic alcohol is propanol 1 in the percentage of about 45 to 35 percent.

* * * * *